(12) United States Patent  
Oh

(10) Patent No.: US 9,069,406 B2  
(45) Date of Patent: Jun. 30, 2015

(54) MIXER FOR USE IN TOUCH PANEL SYSTEM AND METHOD FOR PROCESSING SIGNALS IN THE MIXER

(75) Inventor: Do-Hwan Oh, Seoul (KR)

(73) Assignee: MELFAS INC., Seoul (KR)

( * ) Notice: Subject to any disclaimer, the term of this patent is extended or adjusted under 35 U.S.C. 154(b) by 393 days.

(21) Appl. No.: 13/528,176

(22) Filed: Jun. 20, 2012

(65) Prior Publication Data

US 2012/0327000 A1  Dec. 27, 2012

(30) Foreign Application Priority Data

Jun. 21, 2011 (KR) .......................... 10-2011-0059897

(51) Int. Cl.  
*G06F 3/041* (2006.01)

(52) U.S. Cl.  
CPC .................................. *G06F 3/0416* (2013.01)

(58) Field of Classification Search  
CPC ............ G06F 3/044; G06F 3/041; G06F 1/04  
See application file for complete search history.

(56) References Cited

U.S. PATENT DOCUMENTS

| 8,743,062 B2* | 6/2014 | Krah et al. .................... 345/173 |
| 2006/0038810 A1 | 2/2006 | Ebata et al. |
| 2010/0110040 A1* | 5/2010 | Kim et al. ..................... 345/174 |

FOREIGN PATENT DOCUMENTS

| KR | 10-2006-0048885 | 5/2006 |
| KR | 10-2010-0104551 | 9/2010 |

* cited by examiner

*Primary Examiner* — Kenneth Bukowski  
(74) *Attorney, Agent, or Firm* — McKenna Long & Aldridge LLP

(57) ABSTRACT

A mixer of a touch panel system includes a first switch configured to switch a sensing signal in accordance with a reference signal; a second switch configured to switch the sensing signal in accordance with a phase-inverted reference signal from the reference signal. Further, the mixer of the touch panel system includes a first low pass filter configured to perform low-pass filtering on a first output signal produced from the first switch; and a second low pass filter configured to perform low-pass filtering on a second output signal produced from the second switch. Furthermore, the mixer of the touch panel system includes a differentiator configured to differentiate signals produced from the first low pass filter and the second low pass filter, to thereby produce a signal of constant level as the sensing signal.

5 Claims, 3 Drawing Sheets

MIXER FOR USE IN TOUCH PANEL SYSTEM AND METHOD FOR PROCESSING SIGNALS IN THE MIXER

CROSS-REFERENCE TO RELATED APPLICATIONS

The present invention claims priority of Korean Patent Application No. 10-2011-0059897, filed on Jun. 21, 2011 which is incorporated herein by reference.

FIELD OF THE INVENTION

The present invention relates to a touch panel system; and more particularly to a mixer for use in a touch panel system and a method for processing signals in the mixer, which is capable of precisely generating a voltage level representing a signal intensity difference between a sensing signal and a reference signal with a removed high frequency noise component.

BACKGROUND OF THE INVENTION

A touch panel system is designed to estimate a position of a touch and to process a specific function when a finger or an object touches a test displayed on a screen or a specific position of the screen without using an input device such as a keyboard, a mouse, and the like. The touch panel system is employed in various apparatuses, such as mobile phones, PDA (Personal Digital Assistants, notebook computers, navigation devices, PMPs (Portable Media Players), portable gaming devices, and the like. There are several types of this touch panel system such as a resistive touch panel system, a surface acoustic wave touch panel system, an infrared shield touch panel system, an electromagnetic induction touch panel system, and a capacitive touch panel system.

The capacitive touch panel system is classified into a type of determining a touch input using a self-capacitance generated between a touching object and a sensing electrode without applying a specific driving signal thereto, and a type of determining a touch input using mutual-capacitance generated between a touching object and a plurality of sensing electrodes while applying a specific driving signal thereto. The touch panel system using the self-capacitance has a simple circuit and is easily practiced but multi-touch is not easily determined. On the other hand, the touch panel system using the mutual-capacitance is advantageous of determining multi-touch over the self-capacitance touch panel system, but it has a disadvantage of an increased thickness because of dual layer structure thereof.

Each of these touch panel system includes, in general, a window to which a user's finger or an object is touched directly, a sensing electrode of a preset pattern, and a controller analyzing an electric signal provided from the sensing electrode to determine a position where a touch occurs. Here, the sensing electrode includes a plurality of channels and each of the channels corresponds to a touch sensing area.

The touch panel system may determine a touched position within a touch sensing area based on an electric characteristic obtained by comparing a sensing signal transmitted from each of the channels of the sensing electrode and a reference signal.

In the touch panel system as described above, detection of a touch is achieved by comparing capacitance difference caused by the touch with a reference voltage of a constant level, used to determine whether a touch occurs, which is generated by a mixer in the touch panel system. However, the existing mixer may not produce the voltage of constant level precisely due to a high frequency noise components contained in the sensing signal.

SUMMARY OF THE INVENTION

In view of the above, the present invention provides a mixer for use in a touch panel system and a method for processing signals in the mixer, which is capable of precisely producing a voltage level representing the difference between a sensing signal and a reference signal with a removed high frequency noise component.

This may be enabled by performing a low pass filtering on a first output signal and a second output signal, which are obtained by switching the sensing signal in accordance with a first reference signal generated from a signal generator and a second reference signal whose phase is inverted by 180 degrees from that of the first reference signal respectively, to remove the high frequency noise components, and then adding an inverted signal of the signal provided from the second low pass filter and the signal provided from the first low pass filter.

In accordance with a first aspect of the present invention, there is provided a mixer of a touch panel system. The mixer of the touch panel system includes a first switch configured to switch a sensing signal in accordance with a reference signal; a second switch configured to switch the sensing signal in accordance with a phase-inverted reference signal from the reference signal; a first low pass filter configured to perform low-pass filtering on a first output signal produced from the first switch; a second low pass filter configured to perform low-pass filtering on a second output signal produced from the second switch; and a differentiator configured to differentiate signals produced from the first low pass filter and the second low pass filter, to thereby produce a signal of constant level as the sensing signal.

The differentiator may add a signal from the first low pass filter and an inverted signal of a signal from the second low pass filter, to thereby produce the voltage signal of constant level.

In accordance with a second aspect of the present invention, there is provided a method for processing signals in a mixer of a touch panel system. The method for processing signals in the mixer of the touch panel system includes switching a sensing signal inputted from a touch panel in accordance with a first reference signal to produce a first output signal; switching the sensing signal in accordance with a second reference signal obtained by inverting phase in the first reference signal to produce a second output signal; low-pass filtering the first output signal and the second output signal to produce a first and a second low-pass filtered signals; and differentiating the first and the second low-pass filtered signals to generate a signal of constant level The second reference signal may be a signal phase-inverted from the first reference signal.

Further, said differentiating may comprise adding the first low pass filtered signal and an inverted signal of the second low pass filtered signal, to thereby produce the signal of constant level.

In accordance with the present invention, the mixer for use in a touch panel system and the method for processing signals in the mixer are capable of precisely generating a voltage level corresponding to a signal intensity difference between a reference signal and a sensing signal, thereby precisely detecting a touch on a touch panel.

DETAILED DESCRIPTION OF THE EMBODIMENTS

Hereinafter, embodiments of the present invention will be described in detail with reference to the accompanying drawings which form a part hereof.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Figure 1:
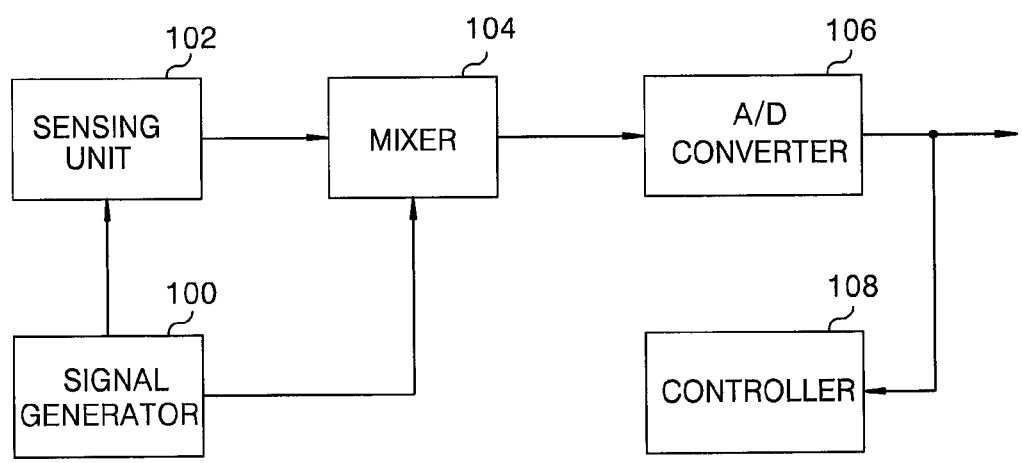
FIG. 1 is a block diagram of a touch panel system including a mixer in accordance with an embodiment of the present invention.

FIG. 1 is a block diagram of a touch panel system including a mixer in accordance with an embodiment of the present invention. The touch panel system includes a signal generator 100, a sensing unit 102, a mixer 104, an analog-digital (A/D) converter 106, and a controller 108.

The signal generator 100 generates a reference signal such as a clock signal and provides the generated reference signal to the sensing unit 102 and the mixer 104. The reference signal provided to the sensing unit 102 may be changed by a touch sensed by the sensing unit 102 and is produced as a sensing signal from the sensing unit 102.

The sensing unit 102 generates the sensing signal when the touch is made on a touch panel of the touch panel system. The generated sensing signal is then applied to the mixer 104. The sensing unit 102 may include a capacitance component that causes a change in capacitance thereof due to the touch. Thus, the sensing unit 102 produces the sensing signal in which a clock of the reference signal from the signal generator 100 is changed according to the change of the capacitance.

The mixer 104 processes the reference signal from the signal generator 100 and the sensing signal from the sensing unit 102 to generate a processed signal having a voltage signal of constant level. In other words, the mixer 104 mixes the reference signal from the signal generator 100 and the sensing signal from the sensing unit 102, converts a mixed signal into a voltage signal of constant level, and provides the converted voltage signal of constant level to the A/D converter 106.

Specifically, when a touch does not occur, the reference signal and the sensing signal may have same frequency and phase with each other. However, when a touch occurs, capacitance of the sensing unit 102 is varied due to the touch, and therefore there occurs a difference in frequency and phase between the reference signal and the sensing signal. Accordingly, if the two signals are mixed by the mixer 104, a level of the voltage signal from the mixer 104 may be relatively lower than that of the voltage signal generated by mixing two signals having same frequency and phase. The change in the levels of the voltage signals is used as information of determining whether a touch is made on the touch panel.

The A/D converter 106 converts the processed signal from the mixer 104, i.e., a level of an analog voltage signal into that of a digital voltage signal and outputs the digital voltage signal to the controller 108.

The controller 108 compares the level of the digital voltage signal from the A/D converter 106 with a level of a preset reference voltage to determine whether there is a touch on the touch panel. For example, the controller 108 determines that a touch occurs when the level of the digital voltage signal is less than 0.8 V, and that the touch does not occur when the level of the digital voltage signal ranges from 0.8 V to 1.2 V.

Figure 2:
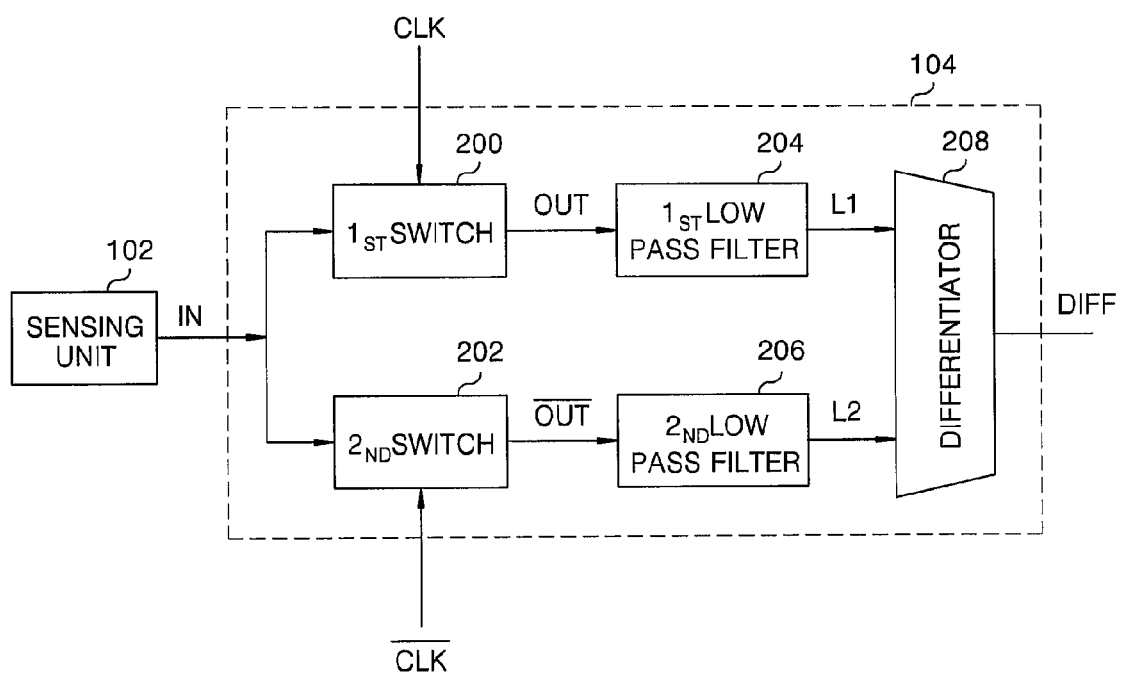
FIG. 2 is a detailed block diagram of the mixer illustrated in FIG. 1 in accordance with the embodiment of the present invention.

FIG. 2 is a detailed block diagram of the mixer 104 illustrated in FIG. 1 in accordance with the embodiment of the present invention. The mixer 104 includes a first switch 200, a second switch 202, a first low pass filter 204, a second low pass filter 206, and a differentiator 208.

Hereinafter, operations of respective elements of the mixer will be described in detail with reference to FIG. 2.

The first switch 200 switches the sensing signal IN inputted from the sensing unit 102 in accordance with a reference signal CLK generated from the signal generator 100.

The second switch 202 switches the sensing signal IN provided from the sensing unit 102 in accordance with an inverted reference signal $\overline{CLK}$ in which a phase of the first reference signal CLK is inverted by 180 degrees.

The first low pass filter 204 performs a low-pass filtering on a first output signal OUT from the first switch 200 to remove high frequency noise components from the first output signal OUT.

The second low pass filter 206 performs a low-pass filtering on a second output signal $\overline{OUT}$ from the second switch 202 to remove high frequency noise components from the second output signal $\overline{OUT}$.

The differentiator 208 differentiate signals produced from the first low pass filter 204 and the second low pass filter 206, to thereby produce a voltage signal of constant level with removed a high frequency noise component. Specifically, the differentiator 208 adds a signal L1 provided from the first low pass filter 204 and an inverted signal of a signal L2 provided from the second low pass filter 206, to thereby produce a voltage signal of constant level without having a high frequency noise components.

As described above, the level of the voltage signal generated by the mixer 104 is converted into a level of a digital voltage signal by the A/D converter 106 and is applied to the controller 108 to be used as data for determining whether a touch occurs. The controller 108 determines that a touch occurs when the level of the digital voltage signal is less than a preset voltage level, e.g., 0.8 V and that the touch does not occur when the digital voltage signal is within a preset voltage level, e.g., ranging from 0.8 V to 1.2 V.

In accordance with an embodiment of the present invention, the low pass filters 204 and 206 are employed in the mixer and therefore the high frequency noise components that would have effect on the sensing signal is filtered so that the voltage level representing the signal intensity difference between the sensing signal and the reference signal may be detected precisely. Accordingly, a more reliable voltage level of the signal provided from the mixer is obtained, which may lead to a more precise detection of the touch in the touch panel system.

FIGS. 3A to 3H illustrate waveforms of signals generated from the respective components in the mixer 104 shown in FIG. 2. Hereinafter, operations of the mixer 104 will be described in detail with reference to FIGS. 2 and 3.

Figure 3A:
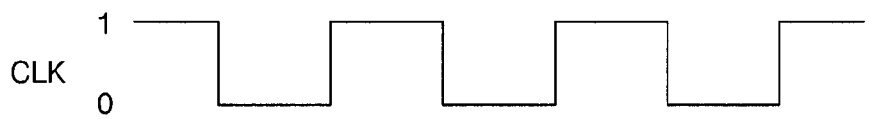
FIGS. 3A to 3H are waveforms at respective components in the mixer shown in FIG. 2 in accordance with the embodiment of the present invention.
Figure 3B:
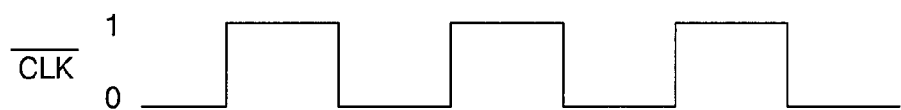

FIG. 3A illustrates a first reference signal CLK, which is generated from the signal generator 100 of the touch panel system. The first reference signal of FIG. 3A is provided to the first switch 200 of the mixer 104. FIG. 3B illustrates a second reference signal $\overline{CLK}$ whose phase is inverted by 180 degrees from that of the first reference signal CLK, which is provided to the second switch 202.

Figure 3C:
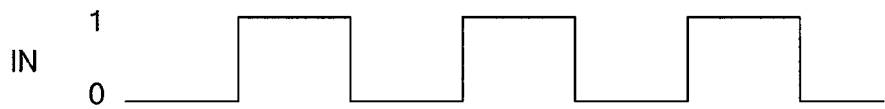

FIG. 3C shows a sensing signal IN generated from the sensing unit 102 when a touch occurs on the touch panel by a touch. The sensing signal IN from the sensing unit 102 is provided to both the first switch 200 and the second switch 202 of the mixer 104, by which the sensing signal IN is switched in accordance with the first reference signal CLK and the second reference signal $\overline{CLK}$.

Figure 3D:
Figure 3E:

FIGS. 3D and 3E show a first output signal OUT and a second output signal $\overline{OUT}$ that are processed in accordance with the first reference signal CLK and the second reference signal $\overline{CLK}$, respectively.

Figure 3F:
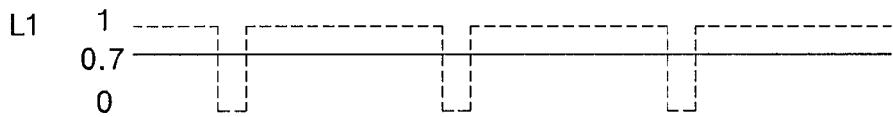
Figure 3G:
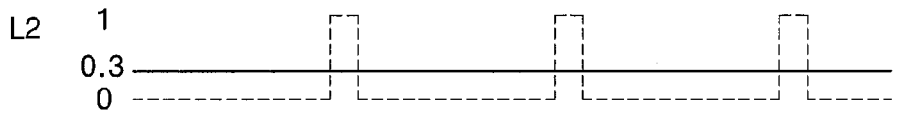

The first output signal OUT and the second output signal $\overline{OUT}$ as illustrated in FIGS. 3D and 3E are subject to low-pass filtering through the first low pass filter 204 and the second low pass filter 206. FIGS. 3F and 3G show filtered signals L1 and L2 obtained by performing the low pass filtering on the first output signal OUT and the second output signal $\overline{OUT}$. For example, the filtered signals L1 and L2 may have voltage levels of 0.7 V and 0.3 V, respectively.

In accordance with an embodiment of the present invention, as described above, low pass filtering is performed on the first output signal OUT and the second output signal $\overline{OUT}$ to remove the high frequency noise components therefrom, before the first output signal OUT and the second output signal $\overline{OUT}$ are provided to the differentiator 208. Consequently, the voltage level of the sensing signal generated by the touch on the touch panel can be measured more precisely.

As described above, the signals L1 and L2 of constant levels that have passed the first low pass filter 204 and the second low pass filter 206 are provided to the differentiator 208. Then, as described above, the differentiator 208 adds the signal L1 provided from the first low pass filter 204 and the inverted signal of the signal L2 provided from the second low pass filter 206, to thereby produce a voltage signal of constant level as the sensing signal.

Figure 3H:
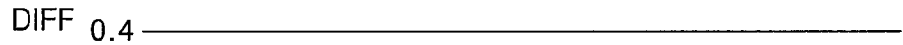

FIG. 3H shows a final output signal DIFF from the differentiator 208 of the mixer 104, that is, a voltage signal of constant level, used to determine whether a touch occurs. As described above, in accordance with the present invention, a low pass filtering is performed on a first output signal and a second output signal respectively, which are obtained by respectively switching the sensing signal in accordance with a first reference signal generated from the signal generator and a second reference signal whose phase is inverted by 180 degrees from that of the first reference signal, through a first low pass filter and a second low pass filter respectively to remove the high frequency noise components. Then, an inverted signal of the signal provided from the second low pass filter and the signal provided from the first low pass filter are added.

Accordingly, it is possible to precisely generate a voltage level corresponding to a signal intensity difference between a reference signal generated from a signal generator and a sensing signal generated from a touch panel, thereby precisely detecting a touch on a touch panel.

While the present invention has been shown and described with respect to the embodiments, the present invention is not limited thereto. It will be understood by those skilled in the art that various changes and modifications may be made without departing from the scope of the invention as defined in the following claims.

What is claimed is:

1. A touch panel system having a mixer, the mixer comprising:
    a first switch that receives a sensing signal from a sensing unit and a reference signal, and that switches the sensing signal in accordance with the reference signal;
    a second switch that receives the sensing signal and a phase-inverted signal of the reference signal, and that switches the sensing signal in accordance with the phase-inverted signal of the reference signal;
    a first low pass filter that performs low-pass filtering on a first output signal produced from the first switch;
    a second low pass filter that performs low-pass filtering on a second output signal produced from the second switch; and
    a differentiator that differentiates signals produced from the first low pass filter and the second low pass filter, to thereby produce a voltage signal of substantially constant level as the sensing signal.

2. The system of claim 1, wherein the differentiator adds a signal from the first low pass filter and an inverted signal of a signal from the second low pass filter, to thereby produce the voltage signal of substantially constant level.

3. A method of detecting a touch in a touch panel system having a mixer, comprising:
    switching a sensing signal inputted from a touch panel in accordance with a first reference signal to produce a first output signal;
    switching the sensing signal in accordance with a second reference signal obtained by phase-inverting the first reference signal to produce a second output signal;
    low-pass filtering the first output signal and the second output signal to produce first and second low-pass filtered signals, respectively; and
    differentiating the first and the second low-pass filtered signals to generate a signal of substantially constant level.

4. The method of claim 3, wherein the second reference signal is a signal phase-inverted from the first reference signal.

5. The method of claim 3, wherein said differentiating comprises adding the first low pass filtered signal and an inverted signal of the second low pass filtered signal, to thereby produce the signal of substantially constant level.

* * * * *